United States Patent [19]

Miura et al.

[11] 4,437,886
[45] Mar. 20, 1984

[54] PROCESS FOR MANUFACTURE OF METALLIC MAGNESIUM

[75] Inventors: Hirohisa Miura, Okazaki; Hiroshi Satou; Toshio Natsume, both of Toyota, Japan

[73] Assignee: Toyota Jidosha Kabushiki Kaisha, Toyota, Japan

[21] Appl. No.: 373,267

[22] Filed: Apr. 29, 1982

[30] Foreign Application Priority Data

May 6, 1981 [JP] Japan .................................. 56-68025

[51] Int. Cl.$^3$ ............................................. C22B 26/22
[52] U.S. Cl. ..................................... 75/67 R; 75/10 R
[58] Field of Search ................... 75/67 R, 67 A, 10 R

[56] References Cited

U.S. PATENT DOCUMENTS 2,380,449  7/1945  Kirk ........................................ 75/67

FOREIGN PATENT DOCUMENTS

38-08204  6/1963  Japan .................................. 75/67 A
45-34005  10/1970  Japan .................................. 75/67 R Primary Examiner—M. J. Andrews
Attorney, Agent, or Firm—Stevens, Davis, Miller & Mosher

[57] ABSTRACT

A process for manufacture of metallic magnesium. A mixture of a first quantity of magnesium oxide, a second quantity of a carbide forming material which is either a material selected from the group of materials consisting of calcium, aluminum, boron, silicon, calcium oxide, aluminum oxide, boron oxide, and silicon oxide, or is a mixture of two or more of these materials, and whose weight is 10% or less than the weight of the first quantity, and a third quantity of carbon which is at least the equivalent mol weight of that of the magnesium oxide plus the carbide forming material, is heated within a reducing furnace at a pressure between about 5 and 200 torr and at a temperature of at least 1600° C. The carbide forming material combines with the carbon to form carbide, which induces simultaneous reducing reaction as that by carbon and reduces the magnesium oxide, releasing magnesium vapor, which is rapidly cooled down by adiabatic expansion to generate metallic magnesium, while the carbide forming material returns to oxide form. The carbide forming material is recycled again, to repeatedly form carbide and repeatedly reduce more magnesium oxide.

8 Claims, 9 Drawing Figures

PROCESS FOR MANUFACTURE OF METALLIC MAGNESIUM

BACKGROUND OF THE INVENTION

The present invention relates to a process for manufacture of metallic magnesium, and, more particularly, relates to an improved process for manufacture of metallic magnesium, by thermal reduction of magnesium oxide, which can produce metallic magnesium of high quality at a relatively low cost, efficiently, and economically.

The following types of prior art processes are already known for manufacturing metallic magnesium: carbon reduction processes, carbide reduction processes, and silicon reduction processes.

Carbon reduction processes, such as the Hansgirg process and so forth, involve causing magnesium oxide and carbon to react at high temperatures according to the equation (1) below, and the resulting metallic magnesium vapor generated by this reaction is rapidly cooled, thus forming solid metallic magnesium.

$$MgO + C = Mg(gas) + CO \qquad (1)$$

The disadvantages of these carbon reduction processes are twofold. First, the metallic magnesium obtained from these processes is in the form of a fine dust, with particles of diameters from about 0.1 to about 0.6 microns; and according to this there is great difficulty in collecting and post processing the metallic magnesium which is produced. Second, the high temperature gaseous metallic magnesium which is produced is very liable to undergo the reverse reaction to equation (1), i.e. to be reconverted back into magnesium oxide, and therefore while collecting the metallic magnesium it is necessary to provide high speed cooling for said metallic magnesium. Two ways are known for providing this high speed cooling: the gas cooling process using hydrogen or natural gas, and the so called adiabatic self cooling process using a divergent nozzle. In the gas cooling process, the fact that a large volume of such gaseous coolant is required means that the manufacturing cost of the final metallic magnesium becomes very high. On the other hand, in the adiabatic self cooling process using a divergent nozzle, in order to overcome the fact that the metallic magnesium is in the above described fine dust form with particles of diameters from about 0.1 to about 0.6 microns, and in order to prevent the reverse reaction to equation (1) occurring, and in order to obtain a high grade of metallic magnesium as a final product, a high vacuum of from about 0.1 to about 0.3 torr is required. This necessitates the provision of a high capacity vacuum pump; and this is expensive, and also during production of metallic magnesium uses a lot of energy to operate, which is also costly. Because of these disadvantages, i.e. because of the basic cost of the process and because of the troublesome form of the metallic magnesium finally produced, the carbon reduction type of process for production of metallic magnesium has not been commercially used since 1945.

Carbide reduction processes, such as the Murex process and so forth, involve causing magnesium oxide to be thermally reduced using calcium carbide ($CaC_2$) as a reducing agent. Now, it is possible to obtain metallic magnesium in this case, similarly as in the above described case of the carbon reduction process. However, the disadvantages of these carbide reduction processes are as follows. First, the cost of the calcium carbide required for reduction of the magnesium oxide is high. Second, a large amount of calcium oxide is produced after the reduction reaction as a troublesome sludge, which needs to be disposed of. Third, the metallic magnesium produced is of rather low grade. Because of these disadvantages, i.e. because of the basic cost of the process and because of the low grade of the metallic magnesium finally produced, the carbide reduction type of process for production of metallic magnesium has not been commercially used since 1945, either.

Silicon reduction processes, such as the Pidgeon process, the I.G. process, the Magnetherm process, and so forth, are the types of process that are currently used for commercial production of metallic magnesium. These processes, however, have the disadvantage that in order to produce one ton of metallic magnesium they consume from about 16,000 kWh to about 20,000 kWh of electrical energy, and produce about six tons of sludg. Accordingly, the final metallic magnesium produced is of rather high cost.

SUMMARY OF THE INVENTION

Accordingly, it is the primary object of the present invention to provide an improved process for production of metallic magnesium, which provides metallic magnesium of high quality at a low cost.

It is a further object of the present invention to provide an improved process for production of metallic magnesium, which provides metallic magnesium without the production of large quantities of sludge.

It is a yet further object of the present invention to provide an improved process for production of metallic magnesium, in which the metallic magnesium collected is cooled by the adiabatic self cooling process, which does not require a very high vacuum to be used.

According to the present invention, these and other objects are accomplished by a process for manufacture of metallic magnesium, comprising the steps, performed in the specified order, of: (a) mixing together: (a1) a first quantity of magnesium oxide; (a2) a second quantity of a carbide forming material which is either a material selected from the group of materials consisting of calcium, aluminum, boron, silicon, calcium oxide, aluminum oxide, boron oxide, and silicon oxide, or is a mixture of two or more of these materials; the weight of said second quantity being 10% or less than the weight of said first quantity; and (a3) a third quantity of carbon, said third quantity being at least the equivalent mol weight of said first quantity of magnesium oxide plus said second quantity of carbide forming material; then (b) heating the resultant mixture within a reducing furnace at a pressure between about 5 and 200 torr and at a temperature of at least 1600° C., so as to generate magnesium vapor; and then (c) cooling the magnesium vapor rapidly by adiabatic expansion thereof so as to generate metallic magnesium.

According to such a process, the carbide forming material of this sort which is added forms a carbide with the carbon, and this carbide efficiently reduces the magnesium oxide to release metallic magnesium which is accumulated in crown form (tightly gathered crown shaped lump) at a high purity; and further the carbide forming material is then repeatedly recycled in oxide form, to again repeatedly form carbide and to again repeatedly reduce more magnesium oxide. Accordingly, the entire quantity of the magnesium oxide is eventually effectively reduced to produce metallic magnesium.

Further, according to a more specialized aspect of the present invention, these and other objects are more particularly and concretely accomplished by a process for manufacture of metallic magnesium, comprising the steps, performed in the specified order, of: (a) mixing together: (a1) a first quantity of magnesium oxide; (a2) a second quantity of a carbide forming material which is either a material selected from the group of materials consisting of calcium, aluminum, boron, and silicon, or is a mixture of two or more of these materials; the weight of said second quantity being 5% or less than the weight of said first quantity; and (a3) a third quantity of carbon, said third quantity being at least the equivalent mol weight of said first quantity of magnesium oxide plus said second quantity of carbide forming material; then (b) heating the resultant mixture within a reducing furnace at a pressure between about 5 and 200 torr and at a temperature of at least 1600° C., so as to generate magnesium vapor; and then (c) cooling the magnesium vapor rapidly by adiabatic expansion thereof so as to generate metallic magnesium.

In this case, according to a still more specialized aspect of the present invention, the weight of said second quantity may be between 0.5% and 3% of the weight of said first quantity.

On the other hand, according to an alternative more specialized aspect of the present invention, these and other objects are more particularly and concretely accomplished by a process for manufacture of metallic magnesium, comprising the steps, performed in the specified order, of: (a) mixing together: (a1) a first quantity of magnesium oxide; (a2) a second quantity of a carbide forming material which is either a material selected from the group of materials consisting of calcium oxide, aluminum oxide, boron oxide, and silicon oxide, or is a mixture of two or more of these materials; the weight of said second quantity being 10% or less than the weight of said first quantity; and (a3) a third quantity of carbon, said third quantity being the at least equivalent mol weight of said first quantity of magnesium oxide plus said second quantity of carbide forming material; then (b) heating the resultant mixture within a reducing furnace at a pressure between about 5 and 200 torr and at a temperature of at least 1600° C., so as to thereby generate magnesium vapor; and then (c) cooling the magnesium vapor rapidly by adiabatic expansion thereof so as to generate metallic magnesium.

In this alternative case, according to a more specialized aspect of the present invention, the weight of said second quantity may be between 1% and 5% of the weight of said first quantity.

According to such a process, in the case of oxide being the carbide forming additive, the amount of said oxide used is desirably fixed, as will be explained in detail later.

Further, according to a particular aspect of the present invention, these and other objects are more particularly and concretely accomplished by a process of any of the sorts described above, wherein the temperature to which said heating is carried out during step (b) is between 1600° C. and 2000° C.

According to such a process, the temperature of said furnace is properly set within the most desirable limits.

Further, according to a particular aspect of the present invention, these and other objects are more particularly and concretely accomplished by a process of any of the sorts described above, wherein it further comprises the step of, after said first quantity of magnesium oxide, said second quantity of carbide forming material, and said third quantity of carbon have been mixed together, forming the resultant mixture into nodule form.

According to such a process, since the mixture of the magnesium oxide, the carbide forming material, and the carbon is formed into nodule form before being heated, thereby disintegration of the mass is effectively prevented. If in fact the carbide forming material includes boron oxide, silicon dioxide, and/or calcium oxide, then since these materials will be in liquid form at the prescribed furnace temperature of 1600° C. or over, thus the disintegration of the mixed mass will be even further hindered.

BRIEF DESCRIPTION OF THE DRAWINGS

The present invention will now be shown and described with reference to several preferred embodiments thereof, and with reference to the illustrative drawings. It should be clearly understood, however, that the description of the embodiments, and the drawings, are all of them given purely for the purposes of explanation and exemplification only, and are none of them intended to be limitative of the scope of the present invention in any way, since the scope of the present invention is to be defined solely by the legitimate and proper scope of the appended claims. In the drawings:

DESCRIPTION OF THE PREFERRED EMBODIMENTS

The present invention will now be described with reference to several preferred embodiments thereof, and with reference to the appended drawings.

As has been previously mentioned, the essence of the present invention is that a carbide of calcium, aluminum, boron, and/or silicon is produced within a reducing furnace, and then magnesium oxide is reduced by this carbide. Although this does not mean that all carbon reacts with magnesium oxide in the form of carbide, and a small amount of carbon reacts directly with magnesium oxide. Now, taking as an example the case in which calcium oxide and carbon are used as additives, an explanation will be made as to under what conditions of temperature and pressure it is believed by the present inventors that the carbide will be produced and the magnesium oxide will be reduced by this produced carbide, and the equations of the reactions which are believed to occur will be given. Later, various embodiments of the process for production of metallic magnesium according to the present invention will be particularly described.

When calcium oxide and carbon are the additives, the reactions which are believed to occur are as follows.

The reaction in which calcium oxide and carbon react to form calcium carbide is believed to be:

$$CaO + 3C = CaC_2 + CO \tag{2}$$

The reactions in which calcium carbide reduces magnesium oxide are believed to be:

$$MgO + CaC_2 = Mg(gas) + CaO + 2C \tag{3}$$

and $$3MgO + CaC_2 = 3Mg(gas) + CaO + 2CO \tag{4}$$

The above reactions obey the second law of thermodynamics, and when the free energy dF is negative the reactions proceed to the right. Here the free energy dF is as follows:

$$dF = dF° + R(T + 273°) \ln Kp \tag{}$$

Here $dF°$ is the standard free energy, R is the gas constant, T is the temperature in Celsius, and Kp is the pressure equilibrium constant.

Figure 1:
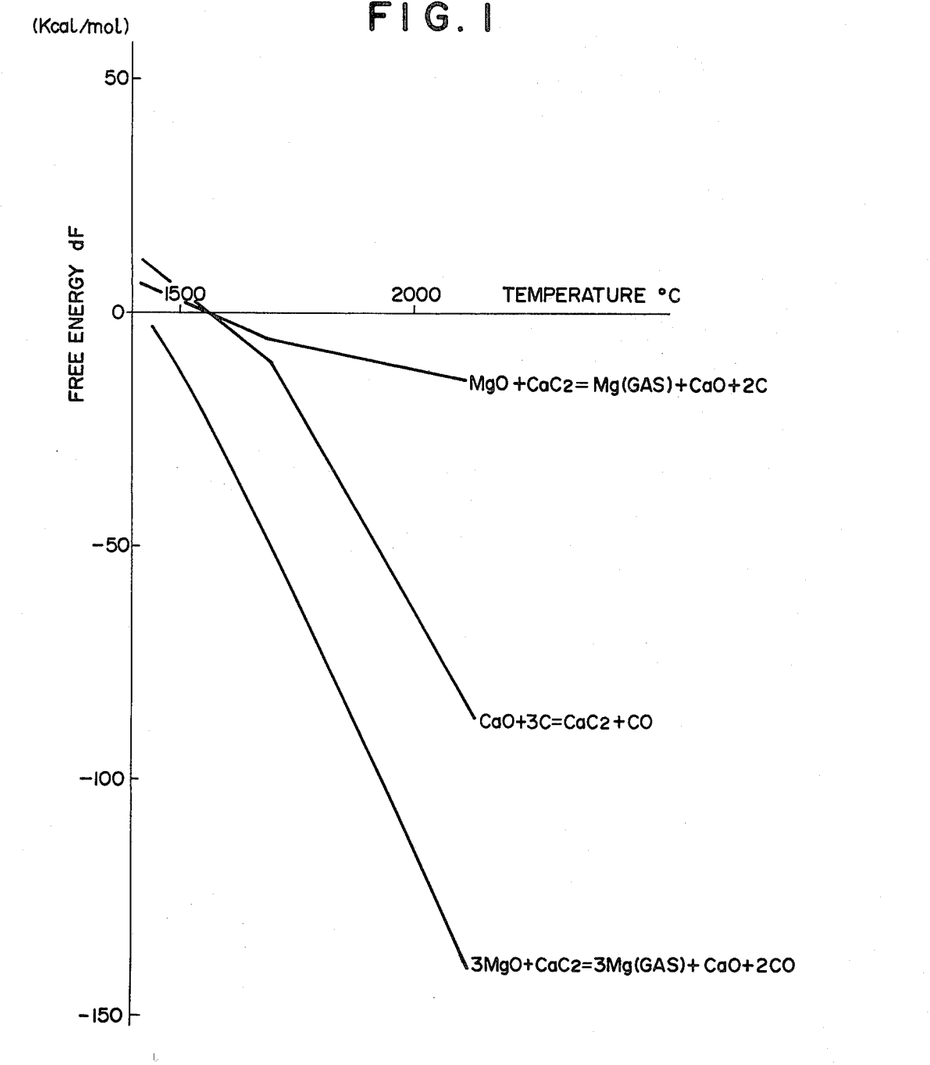
FIG. 1 is a graph, in which temperature in degrees Celsius is the abscissa and energy in Kcal/mol is the ordinate, showing the free energy for each of three reactions.

For the above equations (2) to (4) at a furnace pressure of 20 torr the relation between free energy dF and temperature T in Celsius is shown in FIG. 1. As will be seen from this figure, at a furnace pressure of 20 torr at a temperature of 1600° C. or more the reaction of equation (2) occurs, and next the reactions of equations (3) and (4) occur.

In Table 1 there is shown the relation between the sign of the free energy dF in equations (2) to (4) and the temperature and the pressure. From Table 1 it will be seen that equation (2) proceeds to the right at a temperature of 1600° C. and a pressure of 10 torr or less and at a temperature of 2000° C. proceeds to the right at a pressure of 1000 torr or less. Similarly, equation (3) at a temperature of 1600° C. proceeds to the right at a pressure of 10 torr or less, and at a temperature of 2000° C. and at a pressure of 200 torr or less also proceeds to the right; and equation (4) proceeds to the right at a temperature of 1600° C. and at a pressure of 100 torr or less, and at a temperature of 2000° C. and at a pressure of 1000 torr or less also proceeds to the right. These facts can be seen from the figure.

In the case where the additives are aluminum oxide and carbon, and in the case where the additives are boron oxide and carbon, the reactions which are believed to occur are respectively as shown in the equations (5) to (7) inclusive below, and as shown in the equations (8) and (9) below. By a procedure similar to that in the case of the above equations (2) to (4) the relation between the temperature and the pressure under which these reactions proceed to the right will be investigated in a similar manner for these equations also.

$$2Al_2O_3 + 9C = Al_4C_3 + 6CO \tag{5}$$

$$6MgO + Al_4C_3 = 6Mg(gas) + 2Al_2O_3 + 3C \tag{6}$$

$$9MgO + Al_4C_3 = 9Mg(gas) + 2Al_2O_3 + 3CO \tag{7}$$

$$2B_2O_3 + 7C = B_4C + 6CO \tag{8}$$

$$6MgO + B_4C = 6Mg(gas) + 2B_2O_3 + C \tag{9}$$

$$SiO_2 + 3C = SiC + 2CO \tag{10}$$

$$2MgO + SiC = 2Mg(gas) + SiO_2 + C \tag{11}$$

$$3MgO + SiC = 3Mg(gas) + SiO_2 + CO \tag{12}$$

For the above equations (2) to (12), the relation between the temperature and the pressure under which these reactions proceed to the right is shown in summarized form, for the particular temperatures of 1600° C. and 2000° C., in Table 2.

Furthermore, in the case where metallic calcium and/or aluminum and/or boron, and/or silicon, and carbon, are used as additives, the metal carbide forming reactions are as in the equations (13) to (16) shown below, and since in these equations the free energy dF is negative if the temperature is room temperature or above, in a high temperature reducing furnace these reactions proceed briskly to the right forming the respective carbides.

$$Ca + 2C = CaC_2 \tag{13}$$

$$4Al + 3C = Al_4C_3 \tag{14}$$

$$4B + C = B_4C \tag{15}$$

$$Si + C = SiC \tag{16}$$

From the above observations, and Table 2, it will be seen that for the temperature and the pressure in the process for manufacturing metallic magnesium according to the present invention, values of respectively 1600° C. or more and 300 torr or less are appropriate. For the temperature, however, for reasons of heat loss, and because of limitations of engineering implementation regarding the power of the heating device in the reducing furnace and so forth, at present a temperature of between 1600° C. and 2000° C. is preferable, and furthermore for the pressure, in consideration of the capability of the evacuation system of the vacuum pump, in an engineering implementation, a pressure of between 5 and 200 torr is seen to be preferable.

Now, a description will be made regarding proper amounts of these additives to be added; i.e. the proper amounts of metal or metals such as calcium, aluminum, boron, and/or silicon, or of oxide or oxides such as calcium oxide, aluminum oxide, boron oxide, and/or silicon oxide that should be added, according to the process for manufacturing metallic magnesium according to the present invention.

According to the process for manufacturing metallic magnesium according to the present invention, the metal or metals such as calcium, aluminum, boron, and/or silicon, or the oxide or oxides such as calcium oxide, aluminum oxide, boron oxide, and/or silicon oxide that is added for forming the carbide is reduced by the added carbon in the reducing furnace and temporarily becomes a carbide such as calcium carbide, aluminum carbide, boron carbide, or silicon carbide; but, as will be understood from equations (3), (4), (6), (7), (9), (11), and (12), the carbide formed, after reducing the magnesium oxide to metallic magnesium, reverts to oxide form and once again functions as an additive for forming the carbide, so that therefore the actual additive amount of the metal or metals such as calcium, aluminum, boron, and/or silicon, or of oxide or oxides such as calcium oxide, aluminum oxide, boron oxide, and/or silicon oxide need only be quite small, in order gradually by a cyclical process to reduce the magnesium oxide. Further, even if the amount of additive metal or metals or oxide or oxides is quite small, metallic magnesium in a good crown form can be produced, according to the process of production of metallic magnesium according to the present invention.

In the case that the additive is an oxide or oxides such as calcium oxide, aluminum oxide, boron oxide, and/or silicon oxide, if the additive amount (by weight) relative to the amount of magnesium oxide is 10% or more, then metallic magnesium of sufficiently high purity in crown form may be obtained, but in this case a sludge will be produced at the rate of 0.05 to 0.1 ton per one ton of metallic magnesium. Therefore, for industrial use of the process according to the present invention, the additive amount of oxide or oxides should preferably be not more than 10%, and more preferably should be not more than 5%. As a lower limit to the amount of additive oxide, furthermore, it has been found that, although even when the amount of additive oxide or oxides is less than 1%—for instance is about 0.5%—the reduction of magnesium oxide to produce metallic magnesium is practicable according to the present invention, when the amount of additive oxide is less than 1% then the metallic magnesium obtained is produced in a form which is a mixture of dust form and crown form, which for the reasons stated above is undesirable. Accordingly, 1% is considered to be a proper lower limit for the amount of additive oxide or oxides.

In the case that the additive is a metal or metals such as calcium, aluminum, boron, and/or silicon, then for reasons similar to those cited above in the case of additive oxide or oxides it is considered that the amount of additive metal should be 5% or less, and preferably should be between 0.5% and 3%.

With regard to the amount of carbon to be added, although the mol quantity of carbon needs to be equal to the mol quantity of magnesium oxide so that it is ultimately reduced to metallic magnesium by carbon, since this carbon first forms a carbide with the additive metal or metals such as calcium, aluminum, boron, and/or silicon, or the additive oxide or oxides such as calcium oxide, aluminum oxide, boron oxide, and/or silicon oxide, it is desirable to add at least the equivalent mol weight of carbon which is the sum of the mol weight of the additive metal or metals or oxide or oxides and that of the magnesium oxide; however, substantially more need not be added. This carbon need not all be added as a powder; it may be partially added in nodule, plate, or rod etc. form.

Now, the dust form of metallic magnesium produced according to a conventional carbon reduction process for production of metallic magnesium as described above in the portion of this specification entitled "BACKGROUND OF THE INVENTION" will be compared and contrasted with the crown form of metallic magnesium produced according to the process for manufacture of metallic magnesium according to the present invention.

Figures 2, 3:
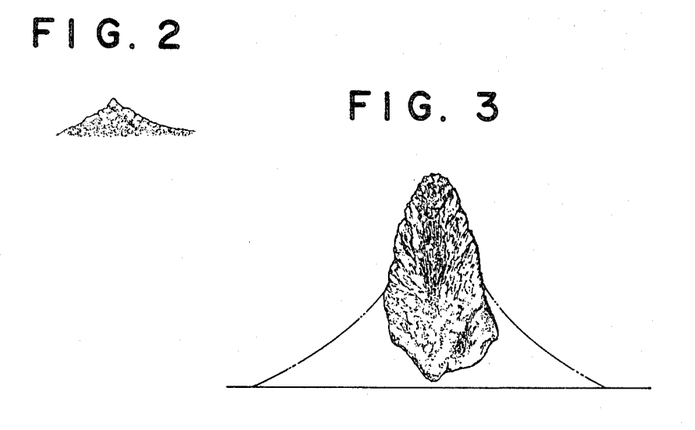
FIG. 2 is a perspective sketch, showing an accumulation of metallic magnesium in dust form which has been collected after being produced by a conventional carbon reduction process for production of metallic magnesium.
FIG. 3 is an explanatory sectional view through the accumulation of metallic magnesium dust shown in FIG. 2, showing it in section at a magnification of 3X.
Figure 4:
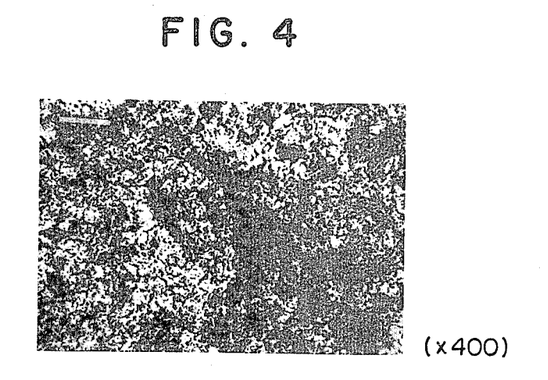
FIG. 4 is a photomicrograph showing the same section of this accumulation of metallic magnesium dust as shown in FIG. 3, at a magnification of 400X.
Figures 5, 6:
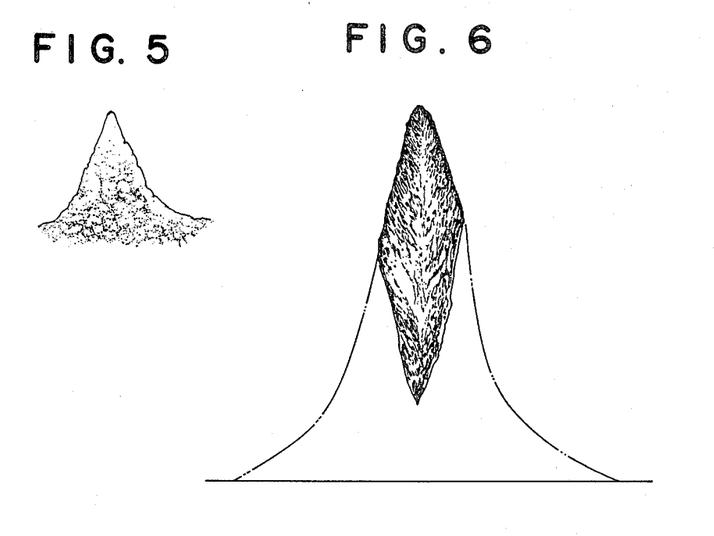
FIG. 5 is a perspective sketch, similar to FIG. 2, showing an accumulation of metallic magnesium in crown form which has been collected after being produced by a process for production of metallic magnesium according to the present invention.
FIG. 6 is an explanatory sectional view through the accumulation of crown form metallic magnesium shown in FIG. 5, showing it in section at a magnification of 3X.
Figure 7:
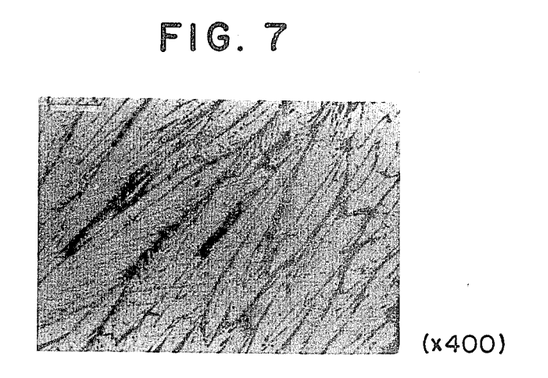
FIG. 7 is a photomicrograph showing the same section of this crown form accumulation of metallic magnesium as shown in FIG. 6, at a magnification of 400X.

FIG. 2 is a perspective sketch, showing an accumulation of magnesium in dust form which was collected after being produced by a conventional carbon reduction process for production of metallic magnesium as described above in the portion of this specification entitled "BACKGROUND OF THE INVENTION". In this carbon reduction process, carbon was added to magnesium oxide in a furnace at a temperature of 1800° C. and at a pressure of 18 torr, using a vacuum chamber pressure of 3 torr. FIG. 3 is an explanatory sectional view showing this accumulation of metallic magnesium dust in section, at a magnification of 3X, and FIG. 4 is a photomicrograph showing the same section of this accumulation of metallic magnesium dust at a magnification of 400X. Further, FIG. 5 is a perspective sketch, similar to FIG. 2, showing an accumulation of magnesium in crown form which was collected after being produced by a process for production of metallic magnesium according to the present invention. In this metallic magnesium production process, 3% of calcium oxide was added to the same amounts of carbon and magnesium oxide as in the previous prior art case, in a furnace at a temperature of 1800° C. and at a pressure of 25 torr, using a vacuum chamber pressure of 2.3 torr. FIG. 6 is an explanatory sectional view showing this accumulation of metallic magnesium in crown form in section, at a magnification of 3X, and FIG. 7 is a photomicrograph showing the same section of this accumulation of crown form metallic magnesium at a magnification of 400X. By the way, the portions of FIGS. 3 and 6 in solid lines show the actual sections of the accumulations of metallic magnesium, after they were removed from the collecting plate, and the phantom or double dotted lines show the outlines of the mounds of metallic magnesium, before these mounds were consumed or lost by combustion and the like, during the separation of the lump of metallic magnesium from the collecting plate.

Referring to FIG. 2, the metallic magnesium produced by the above detaled conventional carbon reduction process in exterior form was rather like a crown, but in practice it consisted of an accumulation of metallic magnesium in dust form with particles of diameter from 0.1 to 0.6 microns, and as seen in FIGS. 3 and 4 its interior was rather coarse and granular. On the other hand, referring to FIG. 5, the metallic magnesium produced by the above detailed process for manufacture of metallic magnesium according to the present invention, using 3% of calcium oxide, was formed in proper crown form, and as seen in FIGS. 6 and 7 its interior was dense and homogeneous. Furthermore, the crown of this mound of metallic magnesium produced according to the present invention as seen in FIG. 6 was twice as high (in fact the height was 27 mm) as was the mound of metallic magnesium produced according to the conventional carbon reduction process. The diameter of the mound of metallic magnesium produced according to the present invention as seen in FIG. 6 was also quite small.

It is thus seen that, according to the present invention, it is possible to produce metallic magnesium of high purity in crown form, with a high height and a small diameter. This is thought to be possible for the following reasons. In the process of manufacture of metallic magnesium according to the present invention, the reaction between the metal oxide and the carbon to produce carbide is a reaction in the solid phase (except that in the case when the oxide is boron oxide and/or silicon dioxide it is a liquid phase reaction), and it is a combination of diffusion of the elements and chemical reactions (carbide reaction and reducing reaction). Generally, a chemical reaction is fast as compared with the diffusion of elements within the solid phase, and therefore the diffusion of the reactants controls the speed of the process. In this case, if a minute quantity of impurity or additive is present, then by the participation of the impurity or additive some elementary reactions occur in parallel and the chemical reaction is accelerated, as per se well known in the art. Considering this fact in the reduction of magnesium oxide, in the conventional carbon reduction process, it is believed that in the portion of contact between the magnesium oxide and the carbon there immediately occurs reduction reaction of the magnesium oxide, but after that the reduction reaction is controlled by the atomic diffusion speed of magnesium or carbon, so as to slow down and thus metallic magnesium is produced in a dust form. On the other hand, in the process of manufacture of metallic magnesium according to the present invention, it is believed that, when for example calcium oxide is used as an additive, rather than a direct reaction between magnesium oxide and carbon, a reaction shown by the equation (2) interposes between them, and procedence is taken by a reaction in which magnesium oxide is reduced by calcium carbide produced by the interposed reaction, and by this reaction metallic magnesium which tends to agglomerate is rapidly produced so as to grow in the form of a crown of high height and small diameter.

Figure 8:
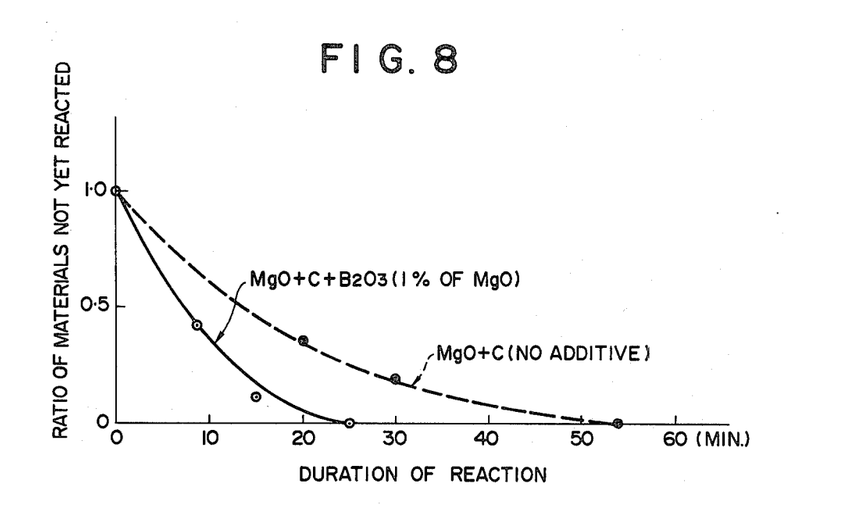
FIG. 8 is a graph, in which duration of reaction of reduction of magnesium oxide is the abscissa and ratio of materials not yet reacted to the starting materials for reduction of magnesium oxide is the ordinate, showing the effect of $B_2O_3$ in expediting the reduction.

It should be noted that if the above described oxide is boron oxide and/or silicon dioxide, the reaction with carbon will be a liquid phase reaction, as a result of which the reaction of reduction of magnesium oxide will proceed faster than in the cases of the other oxides. The graph of FIG. 8 shows an example how the addition of born oxide expedites the reaction of reduction of magnesium oxide as compared with the conventional process in which only carbon is used to reduce magnesium oxide.

Now, eight embodiments of the process for manufacture of metallic magnesium according to the present invention will be described, designated Processes 1 to 8 inclusive; and they will be compared and contrasted with a ninth process for manufacture of metallic magnesium, in which no oxide or metal is added, Process 9—this ninth process not being a process according to the present invention, but being a conventional carbon reduction process.

Figure 9:
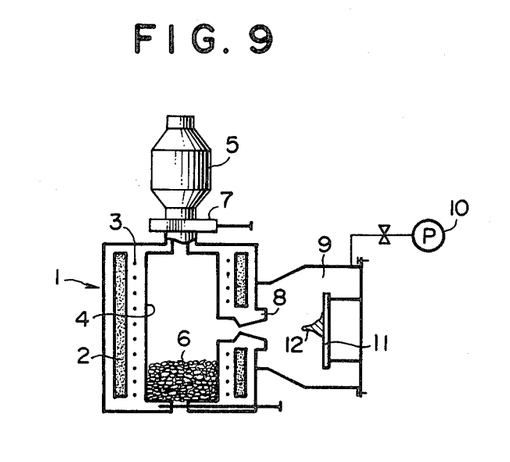
FIG. 9 is a schematic part sectional view, showing an apparatus for practicing the process for manufacture of metallic magnesium according to the present invention.

FIG. 9 shows in schematic part sectional form an apparatus for practicing the process for manufacture of metallic magnesium according to the present invention. In this figure, the reference numeral 1 designates a reducing furnace, the inside chamber 4 of which is insulated from the outside by insulating material 2. The inside chamber 4 of the reducing furnace 1 is heated by a heater 3. Above the reducing furnace 1 there is provided a solid raw material charging hopper 5, in which the raw materials for the process for manufacture of metallic magnesium according to the present invention are placed, and this solid raw material charging hopper 5 is communicated via a control valve 7 with the interior chamber 4 of the reducing furnace 1. Thus this control valve 7 controls the amount 6 of raw materials for the process for manufacture of metallic magnesium according to the present invention which is at any time within the furnace chamber 4. The furnace chamber 4 is communicated via a divergent nozzle 8 with a vacuum chamber 9, which is maintained at a specified vacuum level by a vacuum pump 10. A collecting plate 11 for metallic magnesium is provided within the vacuum chamber 9, aligned with the divergent nozzle 8. Thus, as the metallic magnesium vapor produced within the furnace interior chamber 4 squirts out through the divergent nozzle 8, being adiabatically self cooled by this squirting process, it impacts upon the collecting plate 11 to be collected in solid crown form.

Table 3 shows for each of Processes 1 through 9 detailed above the additive material or materials used for addition to the magnesium oxide plus carbon, the furnace temperature, the pressures in the furnace chamber and in the vacuum chamber, the duration of process, the purity of the metallic magnesium obtained, and its form.

As will be understood from Table 3, the metallic magnesium obtained in the comparison example (9) in which no oxide or metal is added, i.e. in the conventional carbon reduction process for production of metallic magnesium, was in dust form (D), and furthermore its purity at 78.5% was not very good. This is thought to be because no oxide or metal was added, and also because the pressure of the vacuum chamber 9, at 3.0 torr, was high compared with the vacuum pressure necessary with such a conventional carbon reduction process, although it was average compared with the vacuum pressures used in Processes 1 through 8 for manufacture of metallic magnesium according to the present invention. On the other hand, by comparison with this, with all of the eight processes 1 through 8 of the process for manufacture of metallic magnesium according to the present invention the metallic magnesium produced was in crown form (C), and its purity was high, between 93% and 95%, which is excellent. It is thought that this is because the added oxide such as calcium oxide, aluminum oxide, boron oxide, silicon oxide, and/or aluminum forms a carbide within the reducing furnace 1, according to the reactions explained above, and this carbide reduces the magnesium oxide effectively.

Now comparisons between the process for manufacture of metallic magnesium according to the present invention and the prior art will be summarized.

According to the process for manufacture of metallic magnesium according to the present invention, it is possible to use as additives to the magnesium oxide carbon and an oxide such as calcium oxide, which are both cheap and easily obtained. In the process carbide is formed in the furnace, and this carbide (and also partly metal) formed in the furnace reduces the magnesium oxide, as a result of which it is possible to obtain metallic magnesium in the crown form, which is well suited for collection.

This process for manufacture of metallic magnesium according to the present invention uses, for the production of one ton of metallic magnesium, about 12,000 kWh of electrical energy; and the purity of the metallic magnesium obtained is above 90%. By contrast, in the currently used Pidgeon process of production of metallic magnesium, which is a silicon reduction process, there is used for the production of one ton of metallic magnesium about 16,000 kWh to 20,000 kWh of electrical energy, which is substantially more; and the purity of the metallic magnesium obtained is between 80% and 85%, which is not nearly so good. Further, in the Pidgeon process of production of metallic magnesium, 70% to 80% of the raw materials charged become sludge; whereas in the present process, since the metal or metals such as calcium, aluminum, boron, and/or silicon, or oxide or oxides such as calcium oxide, aluminum oxide, boron oxide, and/or silicon oxide, that is added is used again and again as a carbide forming additive, thus it is not necessary to add a large amount of this additive, and hence no large amount of sludge is formed.

Further, by comparison with the previously described carbide reduction process for manufacture of metallic magnesium, in order to reduce the magnesium oxide 1.5 times its weight of expensive calcium carbide is required, and further an amount of calcium oxide corresponding to this added amount of calcium carbide is generated as sludge. On the other hand, with the process for manufacture of metallic magnesium according to the present invention, the expense of the additive is very little, since as explained above the additive is cheap and furthermore is repeatedly used; and as mentioned above little sludge is generated.

On the other hand, by comparison with the previously described carbon reduction process for manufacture of metallic magnesium using self adiabatic cooling, in contrast to that in the carbon reduction process it was necessary to maintain a high vacuum in the vacuum chamber such as 0.1 to 0.3 torr, which required a vacuum pump which was considerably costly both to install and operate, in the present process for manufacture of metallic magnesium a vacuum in the vacuum chamber of between 2 and 30 torr or thereabouts is quite adequate, and accordingly the industrial application of the process for manufacture of metallic magnesium according to the present invention can be made cheaply and easily and econonmically.

Although the present invention has been shown and described with reference to several preferred embodiments thereof, and in terms of the illustrative drawings, it should not be considered as limited thereby. Various possible modifications, omissions, and alterations could be conceived of by one skilled in the art to the form and the content of any particular embodiment, without departing from the scope of the present invention. For example, mixtures of oxide and metal may be used as the carbide forming additive, in appropriate total mol weight. Other variations might be conceived of. Therefore it is desired that the scope of the present invention, and of the protection sought to be granted by Letters Patent, should be defined not by any of the perhaps purely fortuitous details of the shown embodiments, or of the drawings, but solely by the scope of the appended claims, which follow.

TABLE 1

| REACTION EQUATION | PRESSURE (torr) | TEMPERATURE °C. | | | | | | |
|---|---|---|---|---|---|---|---|---|
| | | 1500 | 1600 | 1700 | 1800 | 1900 | 2000 | 2100 |
| (2) | 1 | | — | — | — | — | — | — |
| | 5 | + | | — | — | — | — | — |
| | 10 | + | | — | — | — | — | — |
| | 50 | + | + | — | — | — | — | — |
| | 100 | + | + | — | — | — | — | — |
| | 200 | + | + | | — | — | — | — |
| | 500 | + | + | + | | — | — | — |
| | 1000 | + | + | + | | | | |
| (3) | 1 | — | — | — | — | — | — | — |
| | 5 | — | — | — | — | — | — | — |
| | 10 | | — | — | — | — | — | — |
| | 50 | + | + | | — | — | — | — |
| | 100 | + | + | + | | — | — | — |
| | 200 | + | + | + | + | + | | |
| | 500 | + | + | + | + | + | + | + |
| | 1000 | + | + | + | + | + | + | + |
| (4) | 1 | — | — | — | — | — | — | — |
| | 5 | — | — | — | — | — | — | — |
| | 10 | — | — | — | — | — | — | — |
| | 50 | + | | — | — | — | — | — |
| | 100 | + | | — | — | — | — | — |
| | 200 | + | + | | — | — | — | — |
| | 500 | + | + | + | | — | — | — |
| | 1000 | + | + | + | + | | | |

TABLE 2

| REACTION EQUATION | TEMP | |
|---|---|---|
| | 1600° C. | 2000° C. |
| (2) | <10 torr | <1000 torr |
| (3) | 10 torr | 200 torr |
| (4) | 100 torr | 1000 torr |
| (5) | 50 torr | 1000 torr |
| (6) | 1000 torr | 1000 torr |
| (7) | 100 torr | 1000 torr |
| (8) | 500 torr | 1000 torr |
| (9) | 10 torr | 500 torr |
| (10) | 1000 torr | 1000 torr |
| (11) | 5 torr | 100 torr |
| (12) | 10 torr | 500 torr |

TABLE 3

| PROCESS No. | ADDITIVE & AMOUNT | TEMP. IN FURNACE °C. | PRES. IN FURNACE torr | PRES. IN VAC. CH. torr | DURATION Hr | Mg PURITY % | Mg FORM |
|---|---|---|---|---|---|---|---|
| 1 | CaO % | 1800 | 25 | 2.3 | 0.52 | 93.0 | C |
| 2 | CaO 1% B$_2$O$_3$ 1% | 1800 | 43 | 7.6 | 0.37 | 96.6 | C |
| 3 | Al$_2$O$_3$ 2% | 1600 | 12 | 1.3 | 1.39 | 95.0 | C |
| 4 | Al 2% | 1800 | 32 | 2.8 | 0.83 | 94.7 | C |
| 5 | B$_2$O$_3$ 1% | 1800 | 28 | 3.1 | 0.46 | 94.2 | C |
| 6 | SiO$_2$ 3% | 1800 | 32 | 3.1 | 0.41 | 93.1 | C |
| 7 | Ca 2% | 1900 | 40 | 4.9 | 0.39 | 93.5 | C |
| 8 | B 3% | 1800 | 34 | 3.0 | 0.39 | 94.9 | C |
| 9 | NONE | 1800 | 18 | 3.0 | 1 | 78.5 | D |

What is claimed is:

1. A process for manufacture of metallic magnesium, comprising the steps, performed in the specified order, of:
   (a) mixing together:
      (a1) a first quantity of magnesium oxide;
      (a2) a second quantity of a carbide forming material which is either a material selected from the group of materials consisting of calcium, aluminum, boron, silicon, calcium oxide, aluminum oxide, boron oxide, and silicon oxide, or is a mixture of two or more of these materials; the weight of said second quantity being 10% or less than the weight of said first quantity; and
      (a3) a third quantity of carbon, said third quantity being at least the equivalent mol weight of said first quantity of magnesium oxide plus said second quantity of carbide forming material;
   then
   (b) heating the resultant mixture within a reducing furnace at a pressure between about 5 and 200 torr and at a temperature of at least 1600° C., so as to effect a first reaction to generate carbide from the selected carbide forming material and the carbon, and a second reaction to reduce the magnesium oxide by the carbide thereby generating magnesium vapor while regenerating the carbide forming material;
   and then
   (c) cooling the magnesium vapor rapidly by adiabatic expansion thereof so as to generate metallic magnesium.

2. A process for manufacture of metallic magnesium according to claim 1, wherein said carbide forming material is particularly selected from calcium, aluminum, boron, and silicon, and the weight of said second quantity is 5% or less than the weight of said first quantity.

3. A process for manufacture of metallic magnesium according to claim 1, wherein said carbide forming material is particularly selected from calcium oxide, aluminum oxide, boron oxide, and silicon oxide.

4. A process for manufacture of metallic magnesium according to claim 2, wherein the weight of said second quantity is between 0.5% and 3% of the weight of said first quantity.

5. A process for manufacture of metallic magnesium according to claim 3, wherein the weight of said second quantity is between 1% and 5% of the weight of said first quantity.

6. A process for manufacture of metallic magnesium according to any one of claims 1, 4 or 5, wherein the temperature to which said heating is carried out during step (b) is between 1600° C. and 2000° C.

7. A process for manufacture of metallic magnesium according to any one of claims 1, 4 or 5, further comprising the step of, after said first quantity of magnesium oxide, said second quantity of carbide forming material, and said third quantity of carbon have been mixed together, forming the resultant mixture into nodule form.

8. A process for manufacture of metallic magnesium according to claim 6, further comprising the step of, after said first quantity of magnesium oxide, said second quantity of carbide forming material, and said third quantity of carbon have been mixed together, forming the resultant mixture into nodule form.

* * * * *